United States Patent [19]

Gebhard

[11] Patent Number: 5,145,129
[45] Date of Patent: Sep. 8, 1992

[54] UNMANNED BOOM/CANARD PROPELLER V/STOL AIRCRAFT

[75] Inventor: David F. Gebhard, Northport, N.Y.

[73] Assignee: Grumman Aerospace Corporation, Bethpage, N.Y.

[21] Appl. No.: 711,058

[22] Filed: Jun. 6, 1991

[51] Int. Cl.⁵ .............................................. B64C 29/00
[52] U.S. Cl. .................................. 244/12.5; 244/12.4; 244/12.1; 244/45 R; 244/45 A; D12/335
[58] Field of Search ............... 244/45 R, 45 A, 49, 244/65, 12.5, 12.4, 12.1, 13, 69, 67; D12/335, 331, 332

[56] References Cited

U.S. PATENT DOCUMENTS

| D. 133,126 | 7/1942 | Woods | D12/335 |
|---|---|---|---|
| 3,159,361 | 12/1964 | Weiland | 244/12.1 |
| 3,322,223 | 5/1967 | Bertelsen | 244/12.1 |
| 3,358,946 | 12/1967 | Shye | 244/13 |
| 3,884,432 | 5/1975 | Blanchard | D12/335 |
| 3,966,142 | 6/1976 | Corbett et al. | 244/12.1 |
| 4,116,405 | 9/1978 | Bacchi et al. | 244/12.4 |
| 4,296,896 | 10/1981 | Kress et al. | 244/12.4 |
| 4,478,378 | 10/1984 | Capuani | 244/12.5 |

OTHER PUBLICATIONS

Jane's All the World's Aircraft 1955-1956, pp. 237, 238.
Jane's All the World Aircraft 1957-1958, pp. 355, 356.

*Primary Examiner*—Joseph F. Peters, Jr.
*Assistant Examiner*—Christopher P. Ellis
*Attorney, Agent, or Firm*—Pollock, VandeSande & Priddy

[57] ABSTRACT

An unmanned aircraft is provided which dual turbo shaft engines diving contra-rotating propellers. A bow plane provides pitch control during normal aircraft cruising. The contra-rotating propellers generate a slipstream for wing and tail sections that permit the aircraft to execute hover without the use of complicated tiltable rotor or jet assemblies.

9 Claims, 1 Drawing Sheet

UNMANNED BOOM/CANARD PROPELLER V/STOL AIRCRAFT

FIELD OF THE INVENTION

The present invention relates to aircraft, and more particularly to an unmanned V/STOL aircraft having coaxial propellers and boom/canard structures.

BACKGROUND OF THE INVENTION

Military operations frequently need unmanned aerial vehicles (UAV's) to perform aerial surveillance over: (a) land areas which are under enemy or potential enemy control, or are unacceptably hazardous for manned operation because of a battle situation; and (b) over ocean areas beyond line-of-sight from ships not large enough or suitable for manned surveillance flights, or from larger ships because the surveillance task is too hazardous for manned operation. Simple operation from ships on the high seas and unprepared temporary land sites is an implicit requirement. The fundamental flight mode is loiter at at least modest altitudes, although significant range, dash speed, and altitude are needed for some applications. A variety of sensor packages are normally required, in some cases, e.g. UHF radar, requiring major volumes in the UAV to be specifically shaped and oriented with respect to the flight path.

BRIEF DESCRIPTION OF THE PRIOR ART

Existing UAV configuration technology falls essentially into five basic categories:

1. Conventional takeoff and landing (CTOL) configurations: They tend to look like small airplanes and readily provide flight at low power loading (gross weight/installed horsepower) and hence loiter well and cruise well, although at relatively low speeds. They can readily be catapulted for takeoff with good fuel loads but require several hundred feet for landing, and still more if loiter is compromised to achieve more speed. There are also specialized recovery techniques such as: parachutes, airborne nets, ship based nets, and arresting hooks and wires, none of which fully address the complete UAV requirement. CTOL configurations are, however, inexpensive to develop and acquire.

2. Helicopter configurations: These can provide good loiter and reasonable altitude capability and can easily be launched. They also capitalize on both manned and drone recovery operational experience on ships. Helicopters inherently have limited speed and range capability however, they are mechanically very complex compared to CTOL configurations and thus much more expensive.

3. Highly loaded powered lifting discs (turbo jets or turbo fans) flown with the axis nearly vertical and the exhaust pointed downward. In some configurations several turbines have been ganged together, and suggest "unidentified flying objects" (UFO's). These configurations tend to be very light, compact, and simple. If one calculates the power loading, it is found that the values are extremely high, hence fuel consumption is also extremely high. These configurations are also very inefficient in cruise flight, hence both loiter and cruise are very poor compared to Nos. 1 and 2 above. The exhaust velocities are well above hurricane levels, hence operational sites require special preparation or must be carefully selected. Since the induced velocities at low flight speeds are high compared to wind gusts, however, gust sensitivity is low.

4. Tilt rotor configurations: These couple the low speed advantages of the helicopter (No. 2 above) with the airplane, and thus provide efficient hover, loiter, cruise and altitude performance. They are more complex and hence more expensive than helicopters and are dimensionally very large for a given weight. They also suffer from gust sensitivity in low speed like the helicopter because their induced velocities are not much larger than sudden wind changes under gusty conditions.

5. Tilt turbine configurations: these tilt the powered disc(s) of No. 3 in an airplane type configuration and thus provide both hover and good high speed flight. Two engines can be installed so that one can be shut down for loiter and low speed airplane cruise where the required power levels are low. As with No. 3 gust sensitivity is low, but exhaust velocities are high with the attendant site problems.

BRIEF DESCRIPTION OF THE PRESENT INVENTION

An unmanned aircraft is provided with two turbo shaft engines driving contra-rotating propellers. A bow plane provides pitch control during normal aircraft cruising. The contra-rotating propellers generate a slipstream for wing and tail sections that permit the aircraft to execute hover without the use of complicated tiltable rotor or jet assemblies.

The present invention utilizes contra-rotating propellers which are driven from two turbo-shaft engines through a gear box and drive train which may be manufactured quite compactly, with a minimum of weight providing a great deal of design flexibility. A forward boom serves as a canard and requires the center-of-gravity of the aircraft to be forward of the main wing aerodynamic center. This provides more lever arm for tail control surfaces, thus allowing a lower hover and low speed propeller slipstream velocity; and hence a better installed power to loiter/cruise power match.

In level flight the propellers contribute to wing lift so that conventional flight is enhanced.

The present invention is adapted to both vertical truck bed and conventional rolling take-offs and landings which are all straightforward. For vertical truck operation a transverse wire engages the nose wheel strut. A modest catapult option permits take-off with gross weights well above the static thrust available. The resulting fuel increase permits major mission improvements. The truck bed would be equipped with slipstream deflectors.

The overall aircraft configuration of the present design provides larger internal volume, size, and location options which permit a greater array of sensors to be mounted as well as greater fuel storage capacity. The structural elements surrounding the propellers promote safe operation in confined areas.

The present invention offers a particularly simple configuration solution to an unmanned aircraft requiring high power for take-off and quite a bit less power for a primary mission function, such as loiter. Since fuel efficiency deteriorates greatly at lower power settings, the present invention is equipped with two engines which permit one engine to be shut down during segments of a mission exhibiting low power consumption thus doubling the power setting.

By using an unmanned aircraft configuration in accordance with the present invention, the propulsion disc diameter and power can be readily adjusted to obtain a very good compromise between propulsion slipstream velocity over the tail surfaces for low speed control, take-off and landing as well as mission loiter, cruise, and altitude requirements.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
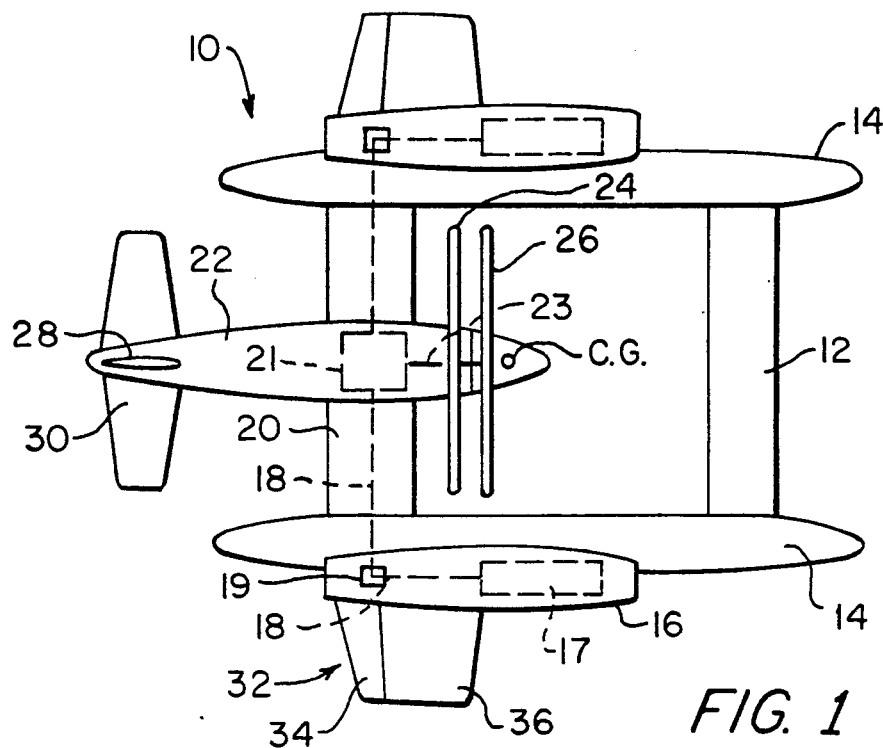
FIG. 1 is a top plan view of the present invention.

Reference numeral 10 generally indicates the unmanned aircraft of the present invention. A transversely situated bow plane 12 is included between two longitudinally oriented support booms 14. The bow plane accomplishes pitch control in the same manner as a canard. The boom has little operability when the aircraft is hovering because no slipstream goes over its surface. The booms may be equipped with a number of sensors, including radar and therefore serve as an excellent housing for surveillance equipment. Nacelles 16 are mounted on the side of each boom 14, the nacelles enclosing engines such as conventional turbo shaft engines 17. Shafts 18 deliver power from the engines 17 through right angle drives 19 which are enclosed within a normal wing 20 until termination to a gear box 21, the latter being located in the fuselage 22 of the aircraft. The gear box 21 has an output shaft 23 which delivers adjustable power and speed to the contra-rotating propellers 24 and 26.

At the end of the fuselage 22 is a vertical movable tail section 28 extending above and below the fuselage. A movable horizontal tail section 30 extends outwardly from both sides of the fuselage. The tail sections 28 and 30 are located within the slipstream generated by the rotating propellers 24 and 26 so that during hover they may provide pitch, roll, and yaw control. Deflection of these surfaces in the slipstream produces forces perpendicular to the fuselage axis acting well behind the center of gravity thus producing pitch, roll, and yaw control at and near hover flight.

Figure 3:
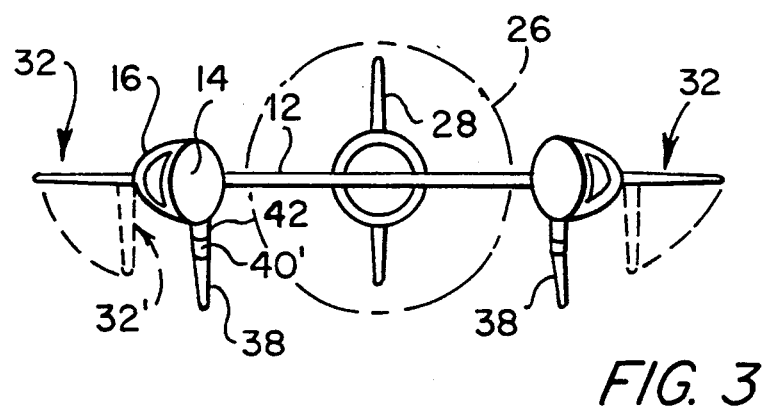
FIG. 3 is a front elevational view of the present invention.

As shown in FIG. 3, wing extensions 32 are rotatably mounted to the nacelles 16 to create additional control and wingspan for improved conventional flight. The wing extensions 32 include a main section 36 to which an aileron 34 is pivotally attached. The wing extensions 32 reside outside the propeller slipstream and would buffet if they were not folded to the perpendicular position shown in FIG. 3 when the aircraft is in a hover or transition mode. Aileron 34 is operated during cruise in a normal manner.

Figure 2:
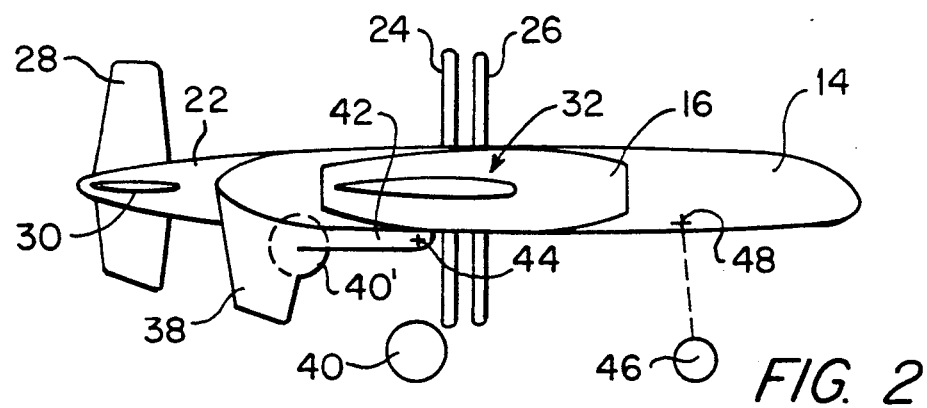
FIG. 2 is a side elevational view of the present invention.

The present aircraft may be launched from a vertical trailer as previously explained. However, normal rolling take-offs and landings may also be realized using the four landing gears, as indicated in FIG. 2. Two rear landing gears 40 may normally be enclosed within a fairing 42 extending horizontally along the undersurface of the booms 14, the landing gears being pivoted about point 44 to a deployed condition during take-off and landing. Likewise, two forward landing gears 46 may be enclosed within the booms 14 until deployment is necessary, at which point the landing gears 46 rotate downwardly about point 48.

The vertical tail section 38 is indicated as being located below the boom 14 but in fact it may be extended above. The vertical tail section 38 provides additional stabilizing surface during portions of flight when the aircraft cruises.

On land, the present invention operates in its primary ground mode from a tiltable bed truck or track vehicle. The aircraft is hung from a transverse wire engaging the nose gear struts and is attached to the tiltable truck bed. Escorting vehicles could carry fuel and a ground control station. Using slipstream deflectors on the truck bed to avoid erosion problems, the only site limitation would be access by the launch vehicles and overhead clearance. Mid-air refueling from a helicopter will add operational flexibility. Landing can be achieved by engaging a transverse wire from a hover or normal landing can be achieved by using the landing gears. In the latter mode, larger outer wing panels could be installed for special extreme range/loiter operation. Tiltable platforms equipped with a transverse wire and slipstream deflectors may be installed on board small ships so that the present aircraft may be carried thereon. The aircraft can be fitted with a deployable refueling hose such that mission duration could be lengthened greatly by refueling from the ship at times when sea state or other operational conditions preclude immediate recovery. At sea, the combination of compactness, low gust sensitivity, catapult launches, and mid-air refueling offers a workable approach to small ship/high sea state problems.

Further, the present aircraft could be carried either externally or internally in military transports and air launch in a fuel heavy overload condition. Recovery could include mid-air refueling prior to final landing.

It should be understood that the invention is not limited to the exact details of construction shown and described herein for obvious modifications will occur to persons skilled in the art.

I claim:

1. An unmanned aircraft comprising:

a fuselage having a pair of propellers mounted to a forward end thereof;

wings extending perpendicularly from a central portion of the fuselage;

a vertical tail section to a rear portion of the fuselage and located in the slipstream generated by the propellers;

a horizontal tail section connected to the rear portion of the fuselage, perpendicular to the vertical tail section and located in the slipstream generated by the propellers;

a pair of booms mounted to the wings and outboard of the propellers extending in parallel spaced relation tot he fuselage and forwardly of the propellers;

a pair of nacelles, each of which is respectively connected to one of the booms and extends in parallel relation thereto;

a wing extension connected to each nacelle and aligned with a respective wing, the extension being perpendicularly foldable with respect to the wing for increasing performance during hover and transition between hover and cruise flight;

engines located in the nacelles;

a drive train connected between the engines and the propellers for rotating the propellers; and a bow plane connected between forward portions of the booms, the plane positioned in parallel spaced relation with the wing and forwardly of the propellers thereby being located outside the slipsteam of the propellers and serving to control pitch of the aircraft during aircraft cruising.

2. The aircraft of claim 1 wherein the propellers are contra-rotating.

3. The aircraft of claim 1 wherein the drivetrain comprises:

output shaft means connected to each engine and extending transversely through a respective wing; and gear box means located in the fuselage and connecting the output shaft means to the propellers.

4. The aircraft of claim 1 wherein each wing extension includes an aileron.

5. The aircraft of claim 1 together with second vertical tail sections extending from rearward ends of the booms for increasing aircraft stability during cruising.

6. An unmanned aircraft comprising:

a fuselage having a pair of contra-rotating propellers mounted to a forward end thereof;

wings extending perpendicularly from a central portion of the fuselage;

a vertical tail section connected to a rear portion of the fuselage and located in the slipstream generated by the propellers;

a horizontal tail section connected to the rear portion of the fuselage, perpendicular to the vertical tail section and located in the slipstream generated by the propellers;

a pair of booms mounted to the ends of the wings and extending in parallel spaced relation to the fuselage and forwardly of the propellers;

a pair of nacelles, each of which is respectively connected to one of the booms and extends in parallel relation thereto;

a wing extension connected to each nacelle and aligned with a respective wing, the extension being perpendicularly foldable with respect to the wing for increasing performance during hover and transition between hover and cruise flight;

engines located in the nacelles;

a drive train connected between the engines and the propellers for rotating the propellers, the drive train having an output shaft means connected to each engine and extending transversely through a respective wing, and gear box means located in the fuselage and connecting the output shaft means to the propellers; and a bow plane connected between forward portions of the booms, the plane positioned in parallel spaced relation with the wing and forwardly of the propellers thereby being located outside the slipstream of the propellers and serving to control pitch of the aircraft during aircraft cruising.

7. The aircraft set forth in claim 6 together with a second vertical tail sections extending from rearward ends of the booms for increasing aircraft stability during cruising.

8. The aircraft set forth in claim 7 wherein each wing extension includes an aileron.

9. The aircraft set forth in claim 8 together with a plurality of recessible landing gears deployed to a position outside a slipstream generated by the propellers.

* * * * *

UNITED STATES PATENT AND TRADEMARK OFFICE
CERTIFICATE OF CORRECTION

PATENT NO. : 5,145,129

DATED : September 8, 1992

INVENTOR(S) : David F. Gebhard

It is certified that error appears in the above-identified patent and that said Letters Patent is hereby corrected as shown below:

On the title page, in the Abstract, line 1, change "which" to --with--;

On the title page, in the Abstract, line 2, change "diving" to --driving--;

Column 4, line 50, after "section" insert --connected--;

Column 4, line 59, change "tot he" to --to the--.

Signed and Sealed this

Seventh Day of September, 1993

*Attest:*

BRUCE LEHMAN

*Attesting Officer*     *Commissioner of Patents and Trademarks*